United States Patent
Smith (10) Patent No.: US 7,130,298 B1
(45) Date of Patent: Oct. 31, 2006

(54) SYSTEMS AND METHODS IMPLEMENTING INTERNET SCREEN DIALING FOR CIRCUIT SWITCHED TELEPHONES

(75) Inventor: Robert Carlquist Smith, Lithia, FL (US)

(73) Assignees: Verizon Corporate Services Group Inc., New York, NY (US); Level 3 Communications, Inc., Bloomfield, CO (US); BBN Technologies Corp., Cambridge, MA (US)

( * ) Notice: Subject to any disclaimer, the term of this patent is extended or adjusted under 35 U.S.C. 154(b) by 742 days.

(21) Appl. No.: 09/620,484

(22) Filed: Jul. 20, 2000

(51) Int. Cl.
*H04L 12/66* (2006.01)

(52) U.S. Cl. ...................... 370/352; 370/465
(58) Field of Classification Search ............... 370/352, 370/353, 354, 356
See application file for complete search history.

(56) References Cited

U.S. PATENT DOCUMENTS

| | | | |
|---|---|---|---|
| 5,377,186 A | 12/1994 | Wegner et al. | |
| 5,838,682 A * | 11/1998 | Dekelbaum et al. | 370/401 |
| 5,905,724 A | 5/1999 | Carson et al. | |
| 5,987,482 A | 11/1999 | Bates et al. | |
| 6,078,582 A * | 6/2000 | Curry et al. | 370/356 |
| 6,130,933 A * | 10/2000 | Miloslavsky | 379/90.01 |
| 6,275,490 B1 * | 8/2001 | Mattaway et al. | 370/352 |
| 6,324,264 B1 * | 11/2001 | Wiener et al. | 379/88.22 |
| 6,366,575 B1 * | 4/2002 | Barkan et al. | 370/352 |
| 6,535,506 B1 * | 3/2003 | Narain et al. | 370/352 |

* cited by examiner

*Primary Examiner*—Huy D. Vu
*Assistant Examiner*—Daniel J. Ryman (57) ABSTRACT

A computer system includes an input device (210) and at least one processor (205). The processor receives (600) an electronic document that includes data representing a telephone number. The processor further receives input via the input device selecting (615) a telephone number from the electronic document. The processor additionally signals (725), via a packet-switched network, a telecommunication system to connect a call between the telephone number and a calling party telephone number in response to the selection of the telephone number.

28 Claims, 7 Drawing Sheets

SYSTEMS AND METHODS IMPLEMENTING INTERNET SCREEN DIALING FOR CIRCUIT SWITCHED TELEPHONES

FIELD OF THE INVENTION

The present invention relates generally to systems and methods for setting up calls between telephones and, more particularly, to systems and methods implementing computer screen dialing for setting up calls between telephones in a telephony network.

BACKGROUND OF THE INVENTION

Conventional electronic mail (e-mail) and Hyper-text Markup Language (HTML) documents have become popular means for sending data across the Internet. These electronic documents often include contact information for persons or entities sending the documents. This contact information typically includes telephone numbers and address information, and can further include conventional web addresses or e-mail addresses in conventional hyper-text format. The hyper-text addresses permit a reader of the document to "click" on the bolded and underline hyper-text, using a conventional mouse, and immediately access a website associated with the hyper-text using a conventional web browser. Hyper-text additionally permits a reader of a document to "click" on hyper-text of e-mail addresses to quickly compose and send e-mail to the e-mail addresses contained in the hyper-text. Conventional hyper-text, therefore, permits quick and easy contact with persons and entities contained in electronic documents.

Electronic documents, however, also often contain telephone numbers associated with persons or entities that a reader may wish to contact. In contrast to the use of hyper-text links, a reader of an electronic document conventionally is required to manually enter a telephone number, contained in the electronic document, into a telephone to enable the reader to contact a person or entity associated with the telephone number.

Therefore, there exists a need for a system and method that, similar to hyper-text links for e-mail and web-site addresses, permit quick and easy establishment of a telephone call with a telephone associated with a telephone number contained in an electronic document, using a computer input device, such as a mouse.

SUMMARY OF THE INVENTION

Systems and methods consistent with the present invention address this need by providing functionality within a computer that recognizes telephone numbers among characters entered into an electronic document and further permits a calling party to initiate a call with a party associated with the telephone number. Call initiation is achieved using a computer input device, such as a mouse, by positioning a pointer over a telephone number displayed in an electronic document and selecting the telephone number (e.g., "clicking" the mouse). After selection of the telephone number, the computer formulates a message containing the telephone number and a calling party number that can be used to establish a connection between a telephone associated with a calling party and a telephone associated with the telephone number of the called party.

In accordance with the purpose of the invention as embodied and broadly described herein, a method of making a telephone call using an electronic document includes receiving an electronic document that includes data representing at least one telephone number; selecting a telephone number from the electronic document; and signaling, via a packet-switched network, a telecommunication system to connect a call between the telephone number and a calling party telephone number in response to the selection of the telephone number.

In another implementation consistent with the present invention, a method of making a telephone call using an electronic document includes receiving, at a computer, an electronic document that includes data representing a telephone number; selecting a telephone number from the electronic document; connecting, if the computer includes a packetized telephone, a packet-switched call to a first telephone associated with the telephone number; and connecting, if the computer does not include a packetized telephone, a circuit-switched call between the first telephone and a second telephone associated with a calling party.

In a further implementation consistent with the present invention, a method of connecting a telephone call includes receiving a request from a calling party, via an input device of a computer, to connect a call to a first telephone; connecting, if the computer includes a packetized telephone, a packet-switched call to the first telephone; and connecting, if the computer does not include a packetized telephone, a circuit-switched call between the first telephone and a second telephone associated with the calling party.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide mechanisms that enable a calling party to initiate a call using a telephone number contained within an electronic document. Call initiation can be achieved, consistent with the present invention, using a computer input device, such as a mouse, through the positioning of a conventional pointer over a telephone number displayed in an electronic document and the selection by the input device (e.g., "clicking" the mouse). Selection of the telephone number initiates a process whereby a connection is established between a telephone associated with a calling party and a telephone associated with the telephone number of the called party.

Exemplary Network

Figure 1:
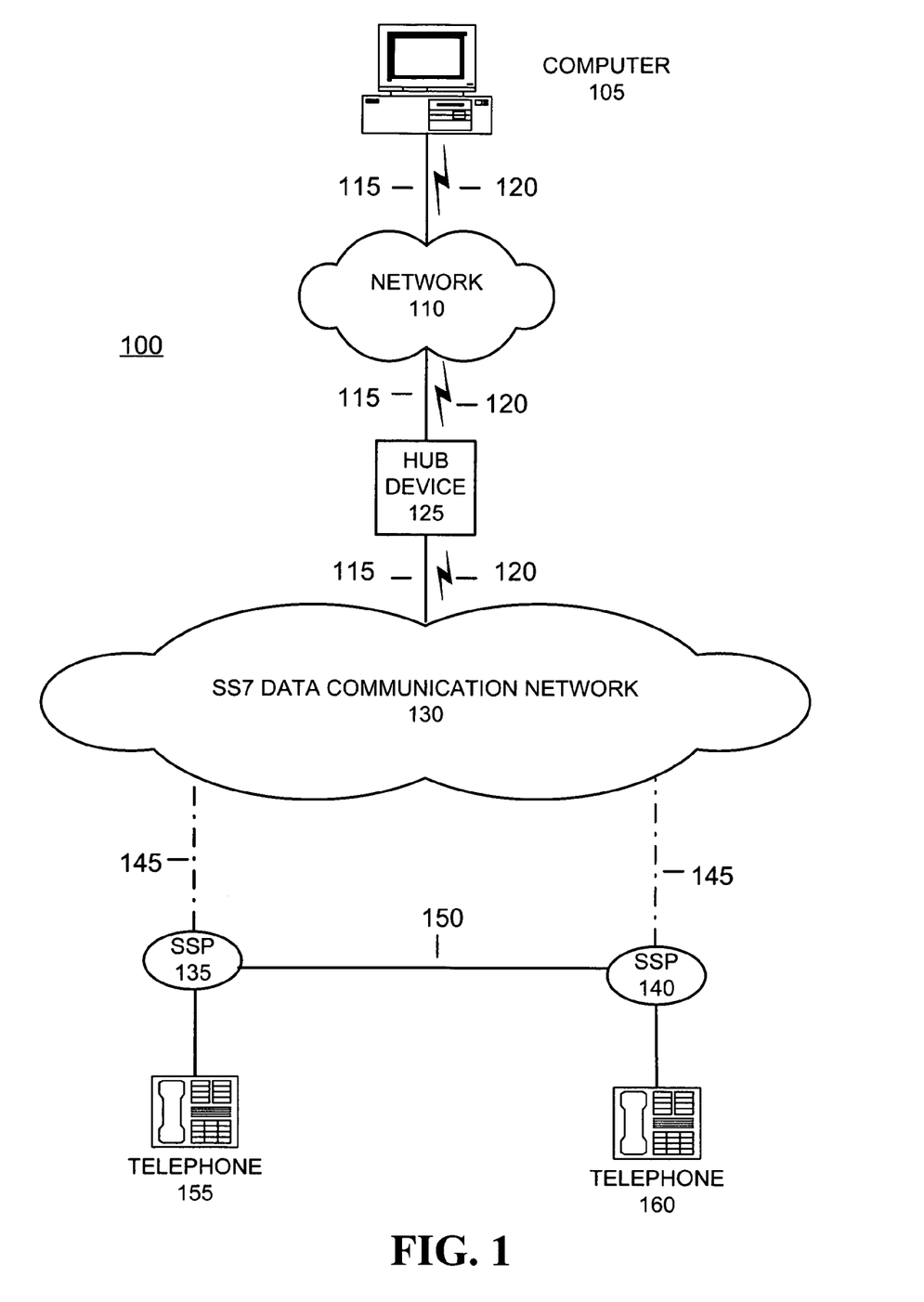
FIG. 1 illustrates an exemplary network in which a system and method, consistent with the present invention, may be implemented.

FIG. 1 illustrates an exemplary network 100 in which a system and method, consistent with the present invention, connects a telephone call using electronic documents received at a computer. Network 100 may include a computer 105, a network 110, a hub device 125, a Signaling System Number 7 (SS7) data communication network 130, service switching points (SSPs) 135 and 140, and telephones 155 and 160. Telephones 155 and 160 can include any type of conventional telephony device known within the art.

Computer 105 may connect to network 110 using a wired 115, wireless 120 or optical connection link (not shown). Network 110 can include one or more packet-switched networks, including local area networks (LANs), metropolitan area networks (MANs), wide area networks (WANs), an intranet, or the Internet. Hub device 125 can include a network node that receives and processes data packets from network 110. Hub device 125 can be connected to network 110 and SS7 network 130 via wired 115, wireless 120 or optical connection links.

SS7 network 130 can include a conventional network that uses SS7 signaling protocols for setting up telephone calls between service switching points 135 and 140. Network 130 can include conventional service control points (SCPs) and signal transfer points (STP) used for the conventional routing of calls between SSPs.

Service switching points 135 and 140 can include conventional network nodes typically associated with central office switching units (not shown) having SS7 messaging capability. Service switching points 135 and 140 connect with one another via link 150. Link 150 includes circuits for connecting calls between telephone 155 and telephone 160. Service switching points 135 and 140 may be connected to SS7 network 130 via links 145.

Exemplary Computer

Figure 2:
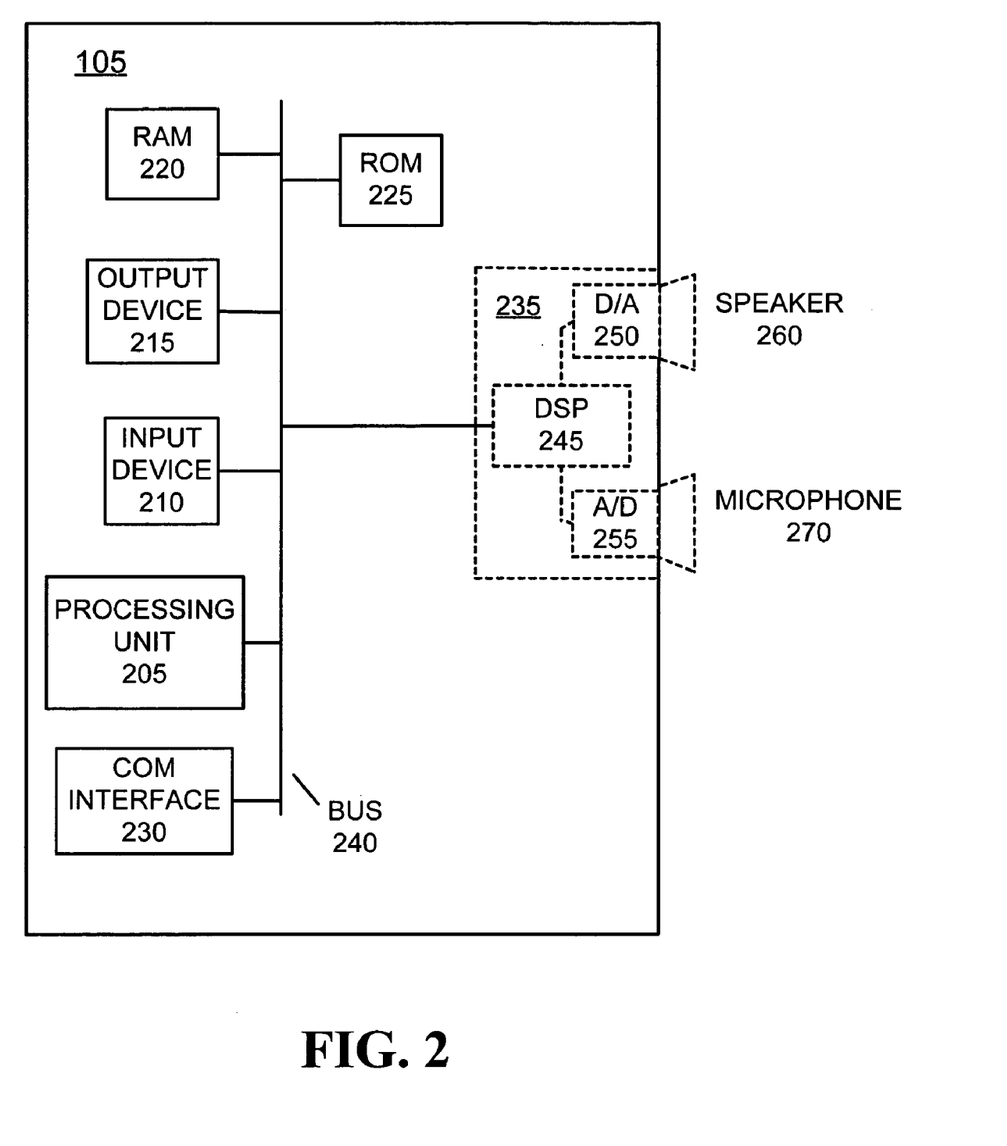
FIG. 2 illustrates exemplary components of a computer consistent with the present invention.

FIG. 2 illustrates an exemplary computer 105 in which a system and method, consistent with the present invention, may be implemented for assisting in the set-up of a call between telephones 155 and 160. Computer 105 may include a processing unit 205, an input device 210, an output device 215, a Random Access Memory (RAM) 220, a Read Only Memory (ROM) 225, a communication interface 230, an optional packetized telephone peripheral 235, and a bus 240.

Processing unit 205 may perform all data processing functions for inputting, outputting, and processing of computer data. Input device 210 permits entry of data into computer 105 and includes one or more user interfaces (not shown), such as a keyboard, a mouse or the like. Output device 215 permits the output of data in video, audio, or hard copy format.

RAM 220 provides semi-permanent working storage of data and instructions for use by processing unit 205. ROM 225 provides permanent or semi-permanent storage of data and instructions for use by processing unit 205. RAM 220 and ROM 225 may include large-capacity storage devices, such as a magnetic and/or optical recording medium and its corresponding drive. Communication interface 230 includes conventional mechanisms for connecting computer 105 to network 110. Bus 240 interconnects the various components of computer 105 to permit the components to communicate with one another.

Packetized telephone peripheral 235 may further include a digital signal processor (DSP) 245, a digital-to-analog (D/A) converter 250, an analog-to-digital (A/D) converter 255, a speaker 260 and a microphone 270. DSP 245 may perform functions, such as packet buffering, voice coding, equalization, and audio data processing. D/A converter 250 includes conventional circuitry for converting digital audio signals to analog signal form for output, for example, via speaker 260. Speaker 260 includes a conventional mechanism for providing an auditory output of the D/A-converted audio signals. A/D converter 255 includes conventional circuitry for sampling and converting analog audio input signals from microphone 270 to digital signal form. Microphone 270 includes a conventional mechanism for converting auditory input into analog signals.

Exemplary Hub Device

Figure 3:
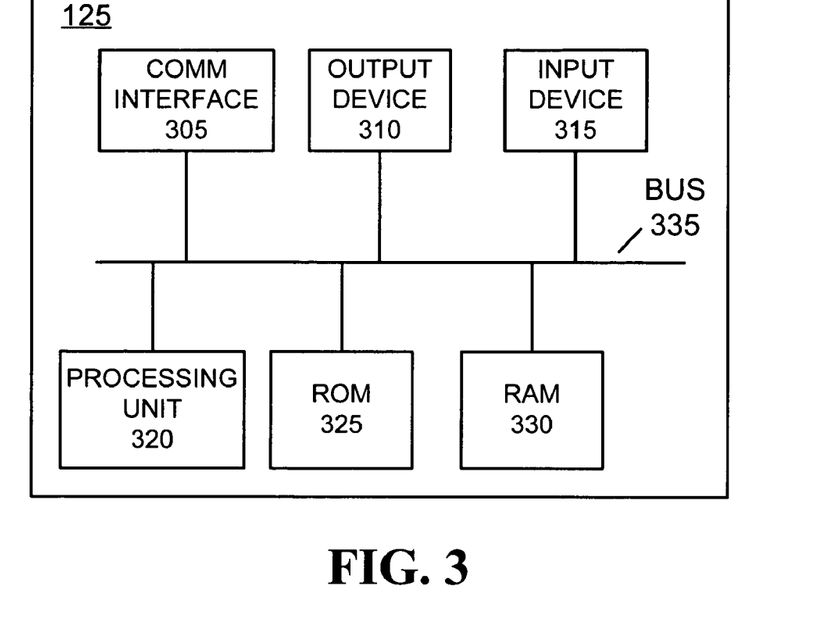
FIG. 3 illustrates exemplary components of a hub device consistent with the present invention.

FIG. 3 illustrates an exemplary hub device 125, which is configured to process packets received from computer 105, consistent with the present invention. Hub device 125 includes a communication interface 305, an output device 310, an input device 315, a processing unit 320, a ROM 325, a RAM 330, and a bus 335.

Communication interface 305 includes conventional mechanisms for connecting hub device 125 with network 110 and SS7 network 130. Output device 310 permits the output of data in video, audio, or hard copy format. Input device 315 permits entry of data into hub device 115 and includes a user interface (not shown). Processing unit 320 performs all data processing functions for inputting, outputting, and processing of data. ROM 325 provides permanent or semi-permanent storage of data and instructions for use by processing unit 320. RAM 330 provides semi-permanent working storage of data and instructions for use by processing unit 320. ROM 325 and RAM 330 may include large-capacity storage devices, such as a magnetic and/or optical recording medium and its corresponding drive. Bus 335 interconnects the various components of the hub device 125 to permit the components to communicate with one another.

Exemplary Document Processing

Figure 5:
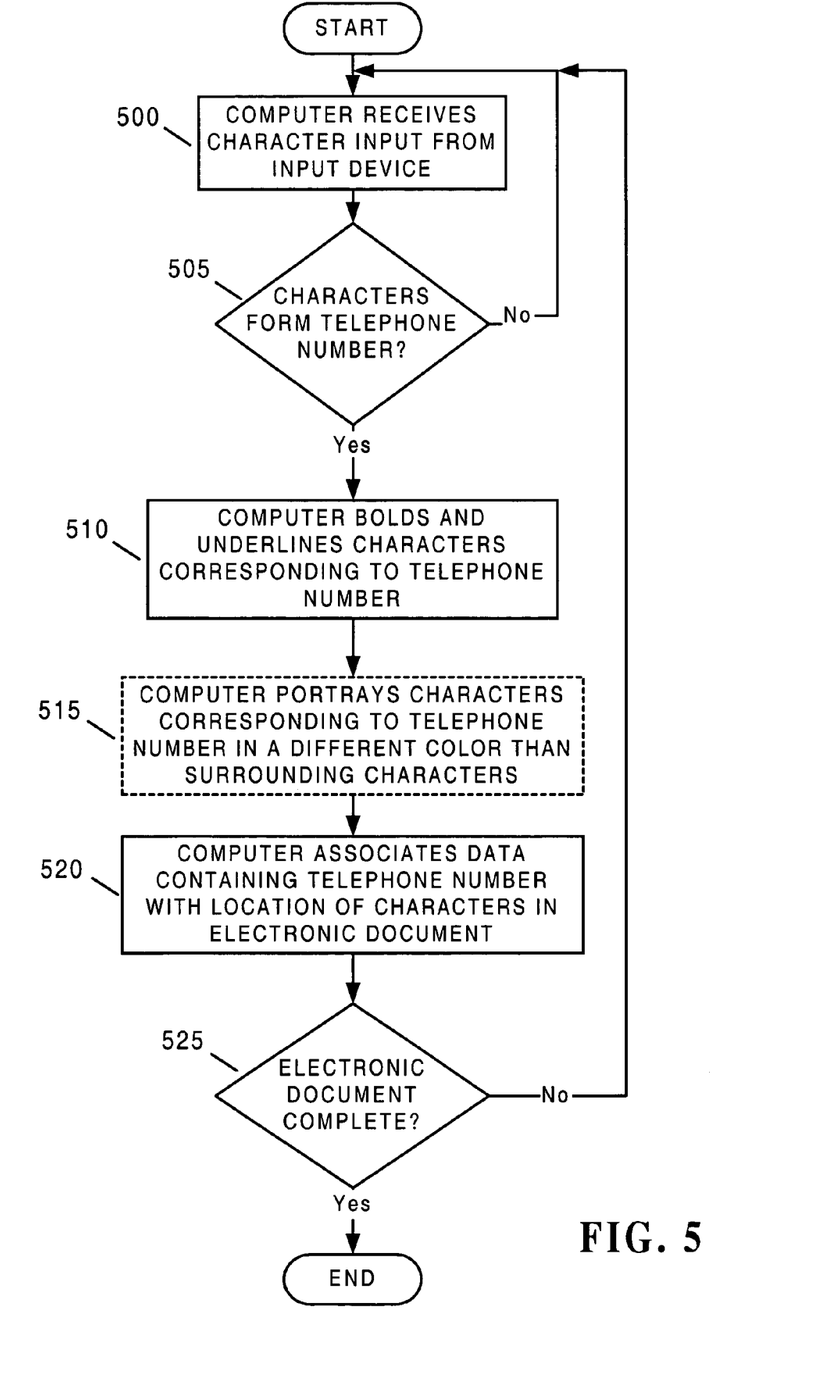
FIG. 5 is a flowchart that illustrates exemplary processing for identifying telephone numbers within an electronic document consistent with the present invention.

FIG. 5 is a flowchart that illustrates exemplary processing, consistent with the present invention, for identifying and highlighting telephones numbers within an electronic document. As one skilled in the art will appreciate, the method exemplified by FIG. 5 can be implemented as a sequence of instructions and stored in ROM 225 of computer 105 for execution by processing unit 205.

To begin processing, computer 105 receives character input at input device 210 [step 500]. The character input can be entered, for example, via a keyboard connected to computer 105. Computer 105 determines if any of the received characters form a telephone number, such as, for example, a 10-digit telephone number in the NXX-NXX-XXXX format prescribed by the North American Numbering Plan (NANP) [step 505]. If so, computer 105 bolds and underlines the characters in the electronic document corresponding to the telephone number [step 510]. If the received characters do not form a telephone number, processing returns to step 500.

Optionally, computer 105 may further portray characters corresponding to the telephone number in a different color than other surrounding characters [step 515]. For example, similar to hyper-text, computer 105 may portray the characters corresponding to the telephone number in the color blue. Computer 105 also associates data, containing the actual telephone number corresponding to the textual characters of the electronic document, with a location of the characters in the electronic document [step 520]. For example, if the textual characters representing the telephone number 444-555-6666 are positioned at location X through location Y in the electronic document, then data, in a format usable for setting up a telephone call, is associated with location X through location Y of the document. Computer 105 then determines if the electronic document is complete [step 525]. Document completion can be indicated, for example, if a user of the computer initiates a conventional "close document" operation. If the document is not complete, processing returns to step 500. If document completion is indicated, then processing ends.

Exemplary Call Set-Up Processing

Figure 6:
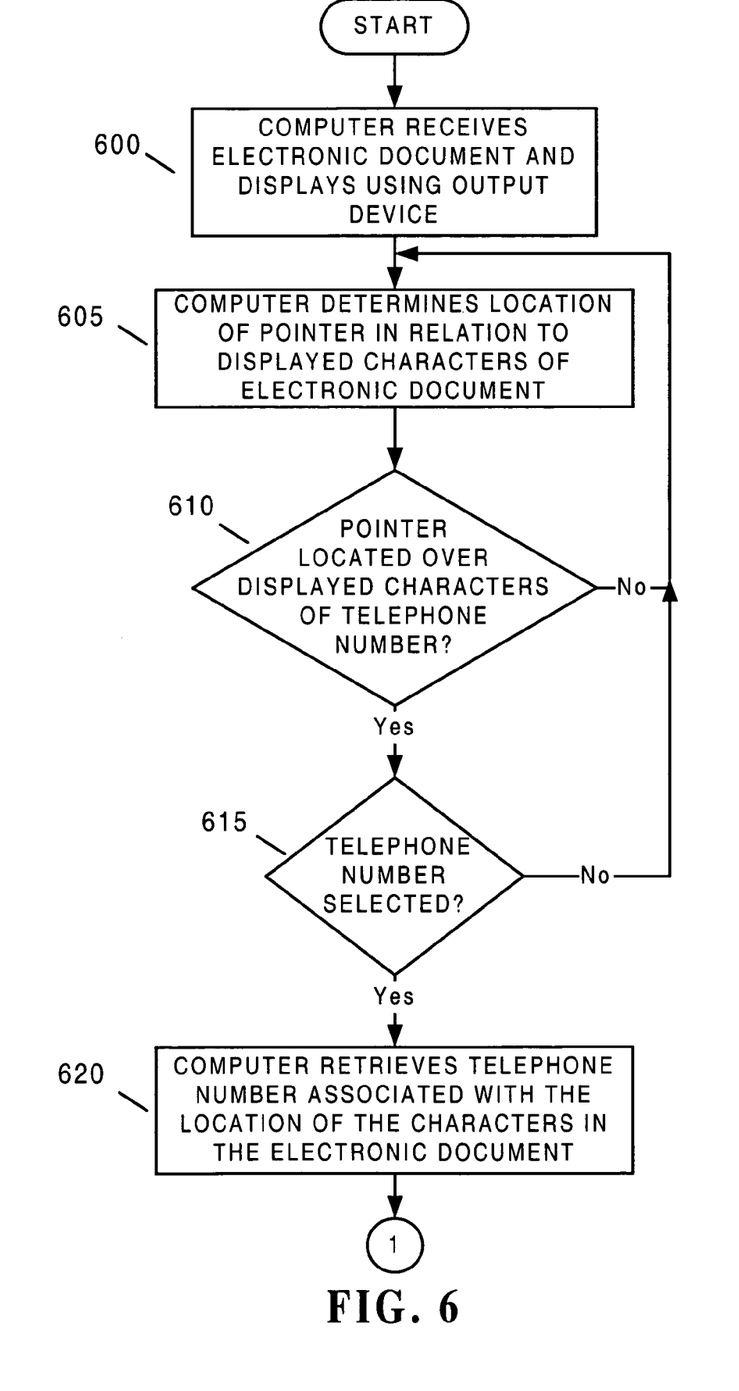
FIGS. 6–8 are flowcharts that illustrate exemplary system processing for setting up a connection between two telephones consistent with the present invention.
Figure 7:
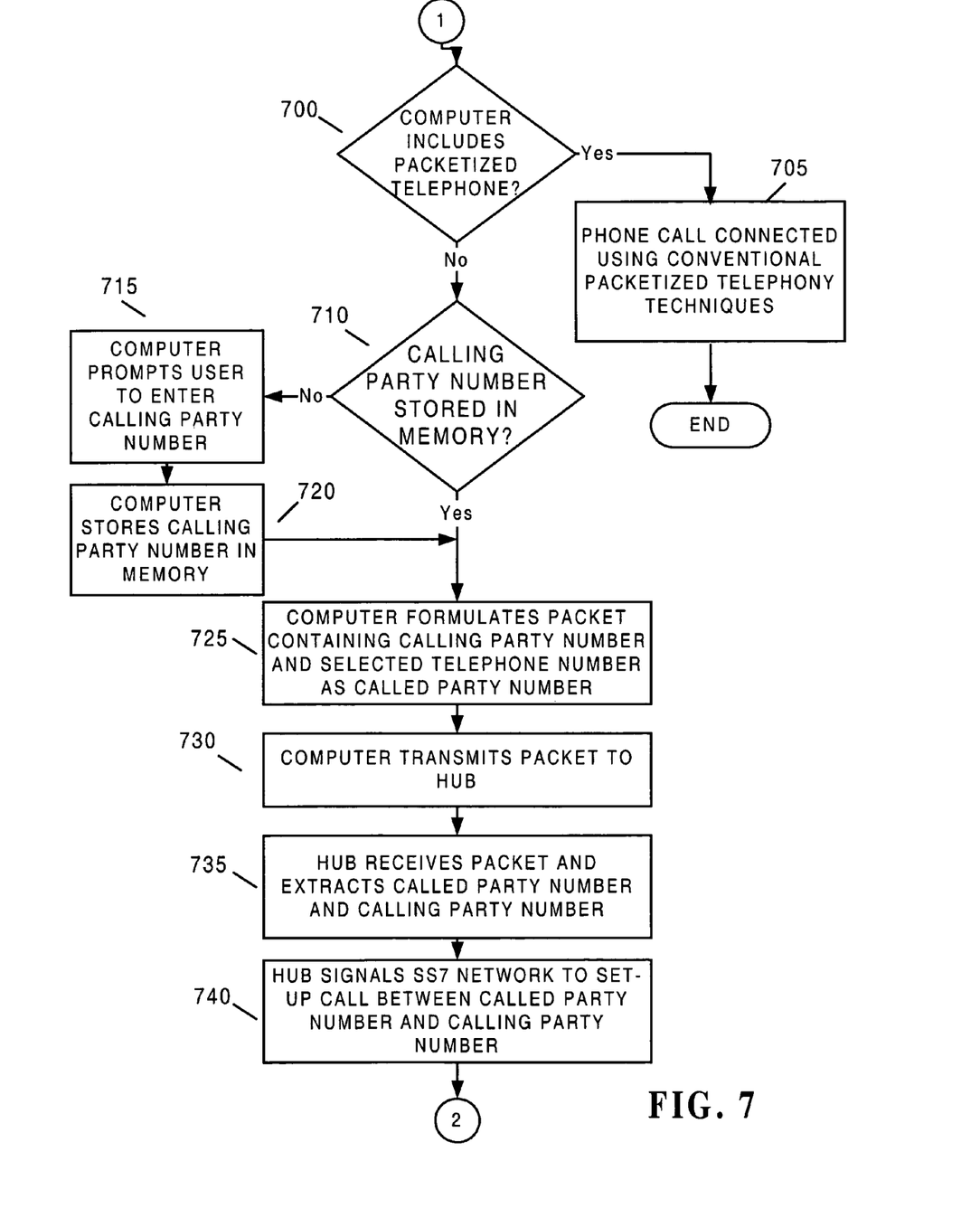
Figure 8:
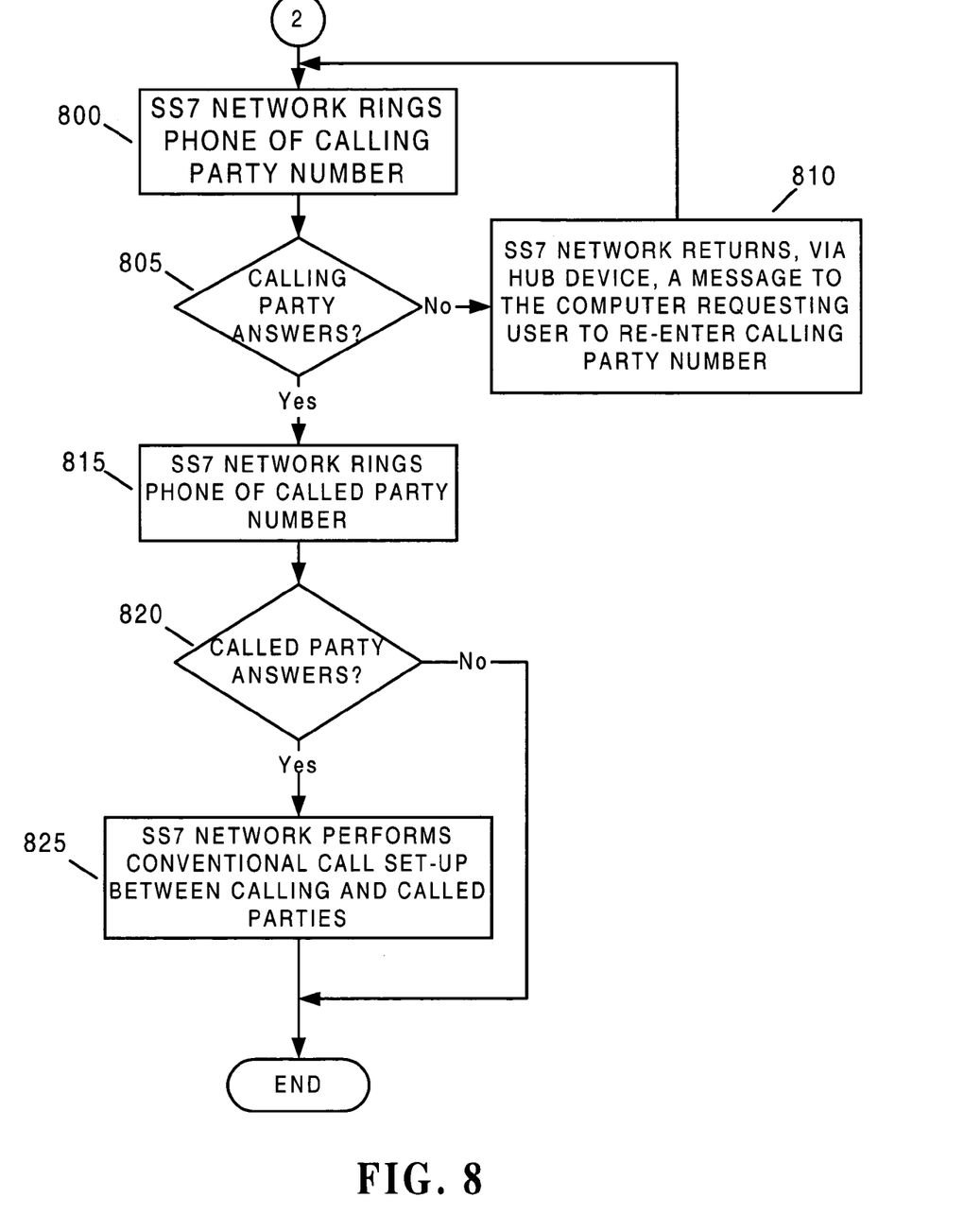

FIGS. 6–8 are flowcharts that illustrate exemplary processing, consistent with the present invention, for setting up a circuit-switched connection between telephones 155 and 160.

Figure 4:
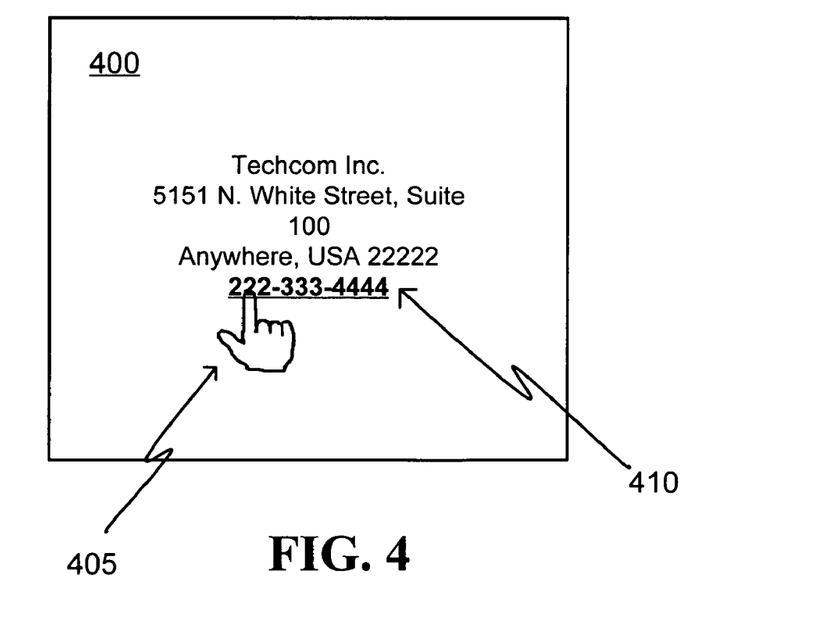
FIG. 4 illustrates a portion of an exemplary electronic document containing a 10 digit telephone number consistent with the present invention.

To begin processing, computer 105 receives an electronic document containing characters comprising one or more telephone numbers and displays the electronic document using output device 215 [step 600] (FIG. 6). Computer 105 then determines, using conventional techniques, a location of a pointer in relation to displayed characters of the electronic document [step 605]. After determination of the location of the pointer, computer 105 determines if the pointer is located over a telephone number displayed on output device 215 [step 610]. If not, processing returns to step 605. FIG. 4 illustrates a portion 400 of an exemplary electronic document containing a telephone number 410 consistent with the present invention. As shown, a user of computer 105 positions the "pointer" 405 over the telephone number using, for example, a conventional mouse.

If the pointer is located over a displayed telephone number, then computer 105 determines if the telephone number has been selected [step 615]. As an example, a user of computer 105 may select a telephone number by "clicking" a conventional mouse when the pointer is located over the displayed telephone number. If the telephone has not been selected, processing returns to step 605. If telephone number has been selected, computer 105 retrieves the data, containing the telephone number, associated with the location of the telephone number characters in the electronic document [step 620].

Computer 105 determines if it includes a packetized telephone peripheral, such as peripheral 235, among its active components [step 700] (FIG. 7). If so, computer 105 sets up a packetized phone call with the called party using packetized telephone peripheral 235 and conventional packetized telephony techniques [step 705]. If computer 105 does not include a packetized telephone peripheral 235, computer 105 then determines if a calling party number has been previously stored in memory [step 710]. If not, computer 105 prompts the user, via output device 215, for example, to enter a calling party number [step 715]. Computer 105 then stores the entered calling party number in RAM 220 [step 720].

Computer 105 formulates a packet containing the calling party number and the selected telephone number as the called party number [step 725]. Computer 105 transmits the formulated packet to hub device 125 via communication interface 230 and network 110 [step 730].

Hub device 125 receives the packet and extracts the called party number and calling party number from the packet [step 735]. Hub device 125 then signals SS7 network 130 to set-up a call between a telephone associated with the called party number (e.g., telephone 155) and a telephone associated with the calling party number (e.g., telephone 160) [step 740]. In response to the signaling from hub device 125, SS7 network 130 rings telephone 160 associated with the calling party number [step 800] (FIG. 8). SS7 network 130 then determines if the calling party answers telephone 155 [step 805]. If the calling party does not answer telephone 160 after a specified period of time, SS7 network 130 returns, via hub device 125, a message to computer 105 requesting the user to re-enter a calling party number [step 810]. However, if the calling party does answer, SS7 network 130 rings telephone 155 associated with the called party number [step 815].

SS7 network 130 next may determine if the called party answers telephone 155 [step 820]. If so, SS7 network 130 performs conventional call set-up between telephone 160, associated with the calling party number, and telephone 155, associated with the called party number [step 825]. If the called party does not answer telephone 160, then the call fails and processing ends. For example, if telephone 155 is involved in another call, processing typically ends with SS7 network 130 returning a "busy" signal to telephone 160.

CONCLUSION

Systems and methods consistent with the present invention provide mechanisms that recognize telephone numbers among characters entered into an electronic document and permit a calling party to initiate a call with a party associated with the telephone number. The present invention, therefore, permits quick and easy establishment of a telephone call with a telephone associated with a telephone number contained in an electronic document using a computer input device, such as, for example a mouse.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Additionally, the present invention is applicable to establishing calls via cell phones, VOIP, video conferencing devices, or any combination thereof. Also, while series of steps have been described with regard to FIGS. 5–8, the order of the steps may be altered in other implementations. No element, step, or instruction used in the description of the present application should be construed as critical or essential to the invention unless explicitly described as such. The scope of the invention is defined by the following claims and their equivalents.

What is claimed is:

1. A method of making a telephone call using a computer having a user interface, the computer operating upon an electronic document, comprising:

receiving an electronic document that includes data representing at least one telephone number;

selecting by way of the user interface a telephone number from a location in the electronic document to obtain a selected telephone number;

retrieving data, associated with the location, from the electronic document, wherein the data comprises the telephone number in a format usable for setting up a call;

determining if a calling party telephone number had been previously stored in local memory in the computer;

prompting a user to enter the calling party telephone number into the computer if the calling party telephone number had not been previously stored in the local memory in the computer, thereby storing the calling party telephone number in the local memory within the computer to obtain a locally stored calling party telephone number;

signaling, via a packet-switched network, a telecommunication system to connect a call between the selected telephone number and the calling party telephone number using the retrieved data by ringing a telephone associated with the calling party telephone number before calling the selected telephone number and, if the telephone is not answered within a specified period of time, by sending a message to the computer to request that the calling party re-enter the calling party telephone number thereby obtaining a locally stored and re-entered calling party telephone number superceding the calling party telephone number and by calling the re-entered calling party number before calling the selected telephone number; and using either the locally stored calling party telephone number or, if superceded, the locally stored and re-entered calling party telephone number to connect all calls from the calling party, subsequent to attempting the call, to any telephone number including the selected telephone number.

2. The method of claim 1, wherein the call is connected across a circuit-switched network.

3. The method of claim 1, wherein the selecting includes:
selecting the telephone number from the electronic document via a mouse.

4. The method of claim 1, wherein the electronic document comprises at least one of an e-mail, a word processing file or a web page.

5. A computer-readable medium containing instructions for controlling at least one processor having a user interface to perform a method of making a telephone call using an electronic document, the method comprising:

selecting by way of the user interface a telephone number from a location in the electronic document to obtain a selected telephone number;

retrieving data, associated with the location, from the electronic document, wherein the data comprises the telephone number in a format usable for establishing a call;

determining if a calling party telephone number had been previously stored in local memory in the computer;

prompting a user to enter the calling party telephone number into the computer if the calling party telephone number bad not been previously stored in the local memory in the computer, thereby storing the calling party telephone number in the local memory within the computer to obtain a locally stored calling party telephone number;

initiating the establishment of a call between the selected telephone number and the stored calling party telephone number using the retrieved data by ringing a telephone associated with the calling party telephone number before calling the selected telephone number and, if the telephone is not answered within a specified period of time, by sending a message to the computer to request that the calling party re-enter the calling party telephone number thereby obtaining a locally stored and re-entered calling party telephone number superceding the calling party telephone number and by calling the re-entered calling party number before calling the selected telephone number; and using either the locally stored calling party telephone number or, if superceded, the locally stored and re-entered calling party telephone number to connect all calls from the calling party, subsequent to attempting the call, to any telephone number including the selected telephone number.

6. The computer-readable medium of claim 5, wherein the call is connected across a circuit-switched network.

7. The computer-readable medium of claim 5, wherein the selecting includes:
selecting the telephone number from the electronic document via a mouse.

8. The computer-readable medium of claim 5, wherein the electronic document comprises at least one of an e-mail, a word processing file or a web page.

9. A computer system, comprising:
an input device;
at least one processor having a user interface configured to:
receive an electronic document;
receive input via the input device by way of the user interface selecting a first telephone number from a location in the electronic document;
retrieve data, associated with the location, from the electronic document, wherein the data comprises the first telephone number in a format usable for setting up a call;
determine if a calling party telephone number had been previously stored in local memory in the computer;
prompt a user to enter the calling party telephone number into the computer if the calling party telephone number had not been previously stored in the local memory in the computer, thereby storing the calling party telephone number in the local memory within the computer to obtain a locally stored calling party telephone number;
signal, via a packet-switched network, a telecommunication system to connect a call between the first telephone number and the stored calling party telephone number using the retrieved data by ringing a telephone associated with the calling party telephone number before calling the first telephone number and, if the telephone is not answered within a specified period of time, by sending a message to the user interface to request that the calling party re-enter the calling party telephone number thereby obtaining a locally stored and re-entered calling party telephone number superceding the calling party telephone number and by calling the re-entered calling party number before calling the first telephone number; and
use either the locally stored calling party telephone number or, if superceded, the locally stored and re-entered calling party telephone number to connect all calls from the calling party, subsequent to attempting the call, to any telephone number including the first telephone number.

10. A method of making a telephone call using an electronic document, comprising:

receiving, at a computer having a user interface, an electronic document that includes data representing a telephone number;

selecting, by way of the user interface, the telephone number from the electronic document to obtain a selected telephone number;

retrieving data, based on the selection, from the electronic document, wherein the data comprises the selected telephone number in a format usable for setting up a telephone call;

determining if a calling party telephone number had been previously stored in local memory in the computer;

prompting a user to enter the calling party telephone number into the computer if the calling party telephone number had not been previously stored in the local memory in the computer, thereby storing the calling party telephone number in the local memory within the computer to obtain a locally stored calling party telephone number;

connecting, if the computer includes a packetized telephone, a packet-switched call to a first telephone associated with the selected telephone number;

connecting, if the computer does not include a packetized telephone, a circuit-switched call between the first telephone and a second telephone associated with the calling party using the retrieved data, by ringing the second telephone before ringing the first telephone and, if the second telephone is not answered within a specified period of time, sending a message to the user interface to request that the calling party re-enter the calling party telephone number thereby obtaining a locally stored and re-entered calling party telephone number superceding the calling party telephone number and calling the re-entered calling party number before ringing the first telephone; and using either the locally stored calling party telephone number or, if superceded, the locally stored and re-entered calling party telephone number to connect all calls from the calling party, subsequent to attempting the circuit-switched call, to any telephone number including the selected telephone number.

11. The method of claim 10, wherein the selecting includes:
selecting the selected telephone number from the electronic document via a mouse.

12. The method of claim 10 wherein the electronic document comprises at least one of an e-mail, a word processing file or a web page.

13. A computer-readable medium containing instructions for controlling at least one processor having a user interface to perform a method of making a telephone call using an electronic document, the method comprising:

selecting, by way of the user interface, a location in an electronic document, wherein the location has associated with it data comprising a telephone number in a format usable for connecting a call;

determining whether packetized telephone capabilities are present;

connecting, if packetized telephone capabilities are present, a packet-switched call to a first telephone associated with the telephone number;

signaling, if packetized telephone capabilities are absent, a telecommunication system to connect a circuit-switched call between the first telephone and a second telephone associated with a calling party using the data; and responsive to the signaling:
determining if a calling party telephone number had been previously stored in local memory in the computer;

prompting a user to enter the calling party telephone number into the computer if the calling party telephone number had not been previously stored in the local memory in the computer, thereby storing the calling party telephone number in the local memory within the computer to obtain a locally stored calling party telephone number;

ringing the second telephone before ringing the first telephone and, if the second telephone is not answered within a specified period of time, sending a message to the user interface to request that the calling party re-enter the calling party telephone number thereby obtaining a locally stored and re-entered calling party telephone number superceding the calling party telephone number and calling the re-entered calling party number before ringing the first telephone; and using either the locally stored calling party telephone number or, if superceded, the locally stored and re-entered calling party telephone number to connect all circuit-switched calls from the calling party, subsequent to attempting the call, to any telephone number including the telephone number.

14. The computer-readable medium of claim 13, wherein the selecting includes:
selecting the telephone number from the electronic document via a mouse.

15. The computer-readable medium of claim 13, wherein the electronic document comprises at least one of an e-mail, a word processing file or a web page.

16. A computer system, comprising:
an input device; and
at least one processor, having a user interface, configured to:
receive an electronic document that includes data representing at least one telephone number, receive input via the input device selecting, by way of the user interface, a first telephone number from the electronic document, retrieve data, based on the selection, from the electronic document, wherein the data comprises the first telephone number in a format usable for setting up a telephone call, determine if a calling party telephone number had been previously stored in local memory in the computer, prompt a user to enter the calling party telephone number into the computer if the calling party telephone number had not been previously stored in the local memory in the computer, thereby storing the calling party telephone number in the local memory within the computer to obtain a locally stored calling party telephone number, connect, if the computer includes a packetized telephone, a packet-switched call to a first telephone associated with the first telephone number, signal, if the computer does not include a packetized telephone, a telecommunication system to connect a circuit-switched call between the first telephone and a second telephone associated with the calling party using the retrieved data, ring, if the computer does not include a packetized telephone, the second telephone before ringing the first telephone and, if the second telephone is not answered within a specified period of time, send a message to the user interface to request that the calling party re-enter the calling party telephone number thereby obtaining a locally stored and re-entered calling party telephone number superceding the calling party telephone number and call the re-entered calling party number before calling the first telephone number; and use, if the computer does not include a packetized telephone, either the locally stored calling party telephone number or, if superceded, the locally stored and re-entered calling party telephone number to connect all calls from the calling party, subsequent to attempting the circuit-switched call, to any telephone number including the first telephone number.

17. A system for making a telephone call using an electronic document, comprising:

means for receiving an electronic document that includes data comprising a first telephone number in a format usable for setting up a call;

means for receiving input via an input device of a computer having a user interface, the computer selecting, by operation of the user interface, the first telephone number from the electronic document;

means for determining if a calling party telephone number had been previously stored in local memory in the computer;

means for prompting a user to enter the calling party telephone number into the computer if the calling party telephone number had not been previously stored in the local memory in the computer, thereby storing the calling party telephone number in the local memory within the computer to obtain a locally stored calling party telephone number;

means for signaling, via a packet-switched network connected to the computer, a telecommunication system to connect a call between the first telephone number and the stored calling party telephone number using the data by calling the stored calling party telephone number before calling the first telephone number and, if a telephone associated with the stored calling party telephone number is not answered within a specified period of time, by sending a message to the user interface to request that the calling party re-enter the calling party telephone number thereby obtaining a locally stored and re-entered calling party telephone number superceding the calling party telephone number and by calling the re-entered calling party number before calling the first telephone number; and means for using either the locally stored calling party telephone number or, if superceded, the locally stored and re-entered calling party telephone number to connect all calls from the calling party, subsequent to attempting the call, to any telephone number including the first telephone number.

18. A method of formatting an electronic document through operation of a computer having a user interface, comprising:

receiving characters for placement in an electronic document;

analyzing the received characters to determine if any of the characters form a first telephone number;

identifying, by way of the user interface, a location of the characters determined to form the first telephone number in the electronic document;

determining if a calling party telephone number had been previously stored in local memory in the computer;

prompting a user to enter the calling party telephone number into the computer if the calling party telephone number had not been previously stored in the local memory in the computer, thereby storing the calling party telephone number in the local memory within the computer to obtain a locally stored calling party telephone number;

associating data, including the first telephone number in a format usable for setting up a telephone call with the stored calling party telephone number, with the location of the characters determined to comprise the first telephone number;

calling the stored calling party telephone number before calling the first telephone number and, if a telephone associated with the stored calling party telephone number is not answered within a specified period of time, sending a message to the user interface to request that the calling party re-enter the calling party telephone number thereby obtaining a locally stored and re-entered calling party telephone number superceding the calling party telephone number and calling the re-entered calling party number before calling the first telephone number; and using either the locally stored calling party telephone number or, if superceded, the locally stored and re-entered calling party telephone number to connect all calls from the calling party, subsequent to attempting the telephone call, to any telephone number including the first telephone number.

19. The method of claim 18, further comprising:

bolding and underlining the characters determined to comprise a telephone number.

20. The method of claim 18, further comprising:

portraying the characters determined to comprise a telephone number in a different color than other surrounding characters.

21. A method of setting up a telephone call using a computer having a user interface, the computer operating upon an electronic document, comprising:

selecting, through operation of the user interface, a called party telephone number displayed at a location in the electronic document;

based on the selection, retrieving data associated with the location from the electronic document, wherein the data comprises the called party telephone number in a format usable for setting up a call;

determining if a calling party telephone number had been previously stored in local memory in the computer;

prompting a user to enter the calling party telephone number into the computer if the calling party telephone number had not been previously stored in the local memory in the computer, thereby storing the calling party telephone number in the local memory within the computer to obtain a locally stored calling party telephone number;

sending a message containing the retrieved data to a remote device to set up a call between the called party telephone number and the calling party telephone number by ringing a telephone associated with the calling party telephone number before calling the called party number and, if the telephone is not answered within a specified period of time, by sending a message to the user interface to request that the calling party re-enter the calling party telephone number thereby obtaining a locally stored and re-entered calling party telephone number superceding the calling party telephone number and by calling the re-entered calling party number before calling the called party telephone number; and using either the locally stored calling party telephone number or, if superceded, the locally stored and re-entered calling party telephone number to connect all calls from the calling party, subsequent to attempting the call, to any telephone number including the called party telephone number.

22. The method of claim 21, wherein the electronic document comprises an email.

23. The method of claim 21 wherein the electronic document comprises a word processing file.

24. The method of claim 21, wherein the electronic document comprises a web page.

25. The method of claim 21, wherein the remote device, responsive to receipt of the message, signals a telecommunication system to set up a call between the called party telephone number and the calling party telephone number.

26. The method of claim 21, wherein characters corresponding to the called party telephone number are associated with the location in the electronic document.

27. The method of claim 26, wherein the characters are bolded and underlined in the electronic document.

28. The method of claim 26, wherein the characters are portrayed in the electronic document in a different color than other surrounding characters not associated with the location in the electronic document.

* * * * *